(12) United States Patent
Akiyama (10) Patent No.: US 9,859,985 B2
(45) Date of Patent: Jan. 2, 2018

(54) OPTICAL TRANSMITTER, OPTICAL TRANSMISSION SYSTEM AND OPTICAL COMMUNICATION CONTROL METHOD

(71) Applicant: FUJITSU LIMITED, Kawasaki-shi, Kanagawa (JP)

(72) Inventor: Yuichi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/062,816

(22) Filed: Mar. 7, 2016

(65) Prior Publication Data

US 2016/0269123 A1 Sep. 15, 2016

(30) Foreign Application Priority Data

Mar. 11, 2015 (JP) .................................. 2015-048180

(51) Int. Cl.
*H04B 10/04* (2006.01)
*H04B 10/12* (2006.01)
(Continued)

(52) U.S. Cl.
CPC ... *H04B 10/5561* (2013.01); *H04B 10/50577* (2013.01); *H04B 10/5161* (2013.01);
(Continued)

(58) Field of Classification Search
CPC .......... H04B 10/5561; H04B 10/50577; H04B 10/5161; H04B 10/532; H04B 10/5055; H04B 10/505; H04B 10/00
(Continued)

(56) References Cited

U.S. PATENT DOCUMENTS 5,170,274 A 12/1992 Kuwata et al.
6,278,539 B1 * 8/2001 Ooi .................. G02F 1/0123
359/237

(Continued)

FOREIGN PATENT DOCUMENTS

JP 03-251815 A 11/1991
JP 2000-162563 A 6/2000
JP 2007-082094 A 3/2007

OTHER PUBLICATIONS

Hyeon Yeong Choi, et al, "BER-adaptive flexible-format transmitter for elastic optical networks References and links", Th.5.A. IEEE Photon. Technol. Lett. J. G. Proakis, Jan. 1, 2009 (Jan. 1, 2009), pp. 66-73, XP055288609.

(Continued)

*Primary Examiner* — Ken N Vanderpuye
*Assistant Examiner* — Abbas H Alagheband
(74) *Attorney, Agent, or Firm* — Fujitsu Patent Center (57) ABSTRACT

An optical transmitter has an electrical signal generator configured to generate an electrical drive signal based upon input data; an optical modulator configured to modulate an input light by the electrical drive signal, the optical modulator having a first waveguide pair, a second waveguide pair, and a phase shifter that provides a phase difference between light waves travelling through the first waveguide pair and the second waveguide pair; and a controller configured to set the phase difference at the phase shifter to 0+n*π radians, where it is an integer, when a modulation scheme of the optical modulator is changed from a first scheme using four or more phase values to a second scheme using two phase values.

11 Claims, 11 Drawing Sheets

(51) Int. Cl.
  *H04B 10/556* (2013.01)
  *H04B 10/516* (2013.01)
  *H04B 10/532* (2013.01)
  *H04B 10/50* (2013.01)
  *H04B 10/00* (2013.01)

(52) U.S. Cl.
  CPC ............ *H04B 10/532* (2013.01); *H04B 10/00* (2013.01); *H04B 10/505* (2013.01); *H04B 10/5055* (2013.01)

(58) Field of Classification Search
  USPC .................... 398/184, 188, 183, 198, 200
  See application file for complete search history.

(56) References Cited

U.S. PATENT DOCUMENTS

| | | | | |
|---|---|---|---|---|
| 7,986,878 | B2* | 7/2011 | Saunders | H04B 10/5053 |
| | | | | 398/25 |
| 8,472,812 | B2* | 6/2013 | Shioiri | H04B 10/5053 |
| | | | | 398/183 |
| 8,781,337 | B2* | 7/2014 | Boffi | H04B 10/505 |
| | | | | 398/183 |
| 9,104,085 | B2* | 8/2015 | Wesstrom | G02F 1/225 |
| 9,172,472 | B2* | 10/2015 | Daunt | H04B 10/5561 |
| 9,448,458 | B2* | 9/2016 | Nishimoto | G02F 1/2255 |
| 9,634,768 | B2* | 4/2017 | Toya | H04B 10/50575 |
| 2001/0007508 | A1 | 7/2001 | Ooi et al. | |
| 2004/0081470 | A1* | 4/2004 | Griffin | H04L 25/03343 |
| | | | | 398/188 |
| 2004/0121740 | A1* | 6/2004 | Miyano | H04B 7/0602 |
| | | | | 455/101 |
| 2006/0127102 | A1 | 6/2006 | Roberts et al. | |
| 2007/0065161 | A1 | 3/2007 | Miura et al. | |
| 2007/0274731 | A1* | 11/2007 | Boffi | H04B 10/505 |
| | | | | 398/188 |
| 2009/0086303 | A1* | 4/2009 | Ide | H04B 10/5561 |
| | | | | 359/279 |
| 2009/0185810 | A1* | 7/2009 | Kaplan | G02F 1/225 |
| | | | | 398/184 |
| 2011/0317238 | A1* | 12/2011 | Boffi | H04B 10/505 |
| | | | | 359/238 |
| 2012/0308240 | A1* | 12/2012 | Akiyama | H04B 10/50575 |
| | | | | 398/141 |
| 2013/0141772 | A1* | 6/2013 | Jiang | H04B 10/50575 |
| | | | | 359/276 |
| 2014/0037286 | A1* | 2/2014 | Krasulick | H04B 10/5561 |
| | | | | 398/38 |
| 2015/0063742 | A1* | 3/2015 | Wesstrom | G02F 1/225 |
| | | | | 385/3 |
| 2015/0236792 | A1* | 8/2015 | Sugihara | H04B 10/516 |
| | | | | 398/183 |
| 2016/0147129 | A1* | 5/2016 | Nishimoto | G02F 1/2255 |
| | | | | 385/2 |

OTHER PUBLICATIONS

EESR—The Extended European Search Report dated Jul. 22, 2016 issued with respect to the corresponding European Patent Application No. 16158916.3

* cited by examiner

EXPECTED WAVEFORM OF MODULATED OPTICAL SIGNAL

FIG.2B

WAVEFORM DEGRADATION

<EXTINCTION RATIO: INFINITE (∞)>

Phase Shift of $-\pi/2$ rad

Phase Shift of $-\pi/4$ rad

Phase Shift of 0 rad

Phase Shift of $\pi/4$ rad

Phase Shift of $\pi/2$ rad

OPTICAL TRANSMITTER, OPTICAL TRANSMISSION SYSTEM AND OPTICAL COMMUNICATION CONTROL METHOD

CROSS-REFERENCE TO RELATED APPLICATIONS

This application is based upon and claims the benefit of priority of the prior Japanese Patent Application No. 2015-048180 filed on Mar. 11, 2015, which is incorporated herein by references in its entirety.

FIELD

The disclosures herein relate to an optical transmitter, an optical transmission system, and an optical communicate ion control method.

BACKGROUND

To achieve next generation high-capacity and long-distance communication systems, a technique for generating modulated optical signals using digital signal processing at a transmitter is being studied. By making use of digital signal processing, not only a modulated optical signal such as a quadrature amplitude modulation (QAM) signal or an orthogonal frequency division multiplexing (OFDM) signal, but also a desired waveform such as a dispersion pre-equalized signal can be produced. Besides, by performing digital signal processing to produce electrical signals for different modulation schemes, modulation can be switched between multiple modulation schemes using a single optical modulator.

In typical optical transmission systems, optical modulators are controlled so as to stabilize signals to be transmitted. A similar stabilization technique is demanded for transmission systems using digital signal processing. One of the known signal stabilization techniques is automatic bias control (ABC), which technique is applied generally to lithium niobate (LiNibO3 abbreviated as LN) modulators. The ABC technique is used to prevent the transmitted signal quality from being degraded due to drift of the bias voltage applied to the LM modulator.

In modulation schemes making use of four or more levels phase shift keying including quadrature phase shift keying (QPSK) or 16-QAM, optical signals modulated by electrical drive signals are produced through an in-phase arm (I-arm) and a quadrature phase arm (Q-arm), respectively. A relative phase difference is provided between the light waves travelling through the I-arm and the Q-arm. In QPSK and 16QAM, a phase shifter is used to provide a phase difference of $\pi/2$ radians between the I-arm and the Q-arm. To maintain the $\pi/2$ phase difference, automatic bias control is applied to the phase shifter. See, for example, Japanese Laid-open Patent Publication No. 2007-082094.

SUMMARY

It is desired to generate a modulated optical signal with a stable characteristic even when modulation is switched between multiple modulation schemes or modulation formats.

According to an aspect of the disclosure, an optical transmitter includes an electrical signal generator configured to generate an electrical drive signal based upon input data, an optical modulator configured to modulate an input light by the electrical drive signal and having a first waveguide pair, a second waveguide pair, and a phase shifter to provide a phase difference between light waves travelling through the first waveguide pair and the second waveguide pair, and a controller configured to set the phase difference at the phase shifter to $0+n*\pi$ radians (n is an integer) when a modulation scheme of the optical modulator is changed from a first (modulation scheme using four or more phase values to a second modulation scheme using two phase values.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

Electrical drive signals produced by digital signal processing allow optical modulation to be switched between different schemes, e.g., between a modulation scheme making use of 4-level phase shift keying (such as QPSK or 16-QAM) and a modulation scheme using two phase values (such as binary phase shift keying abbreviated as BPSK). When performing BPSK, electrical drive signals are applied to one of the I-arm and the Q-arm of an optical modulator to carry out optical phase modulation, while the other arm is turned off in the extinction mode. As long as the optical modulator has an ideal characteristic, an arbitrary value of phase difference may be acceptably provided by a phase shifter between the two arms. However, when the extinction ratio of the optical modulator is finite, it is difficult to achieve complete extinction in the turn-off arm which is not used for optical modulation. Depending on the phase difference provided by the phase shifter, light signals may interfere with each other at the output stage of the optical modulator and the signal characteristic may be degraded.

This technical problem found by the inventor is explained in more detail with reference to FIG. 1. An optical transmission system 200 includes an optical transmitter 150 and an external controller 100. The optical transmitter 150 has an electrical signal generator 10, an optical modulator 20, and a bias controller 140. The electrical signal generator 10 has a digital signal processor (DSP) 11, digital-to-analog converters (DACs) 12I and 12Q, and electrical amplifiers 13I and 13Q. The digital signal processor 11 generates electrical drive signals based upon input signals. The DACs 12I and 12Q convert the electrical drive signals into analog signals. The electrical amplifiers 13I and 13Q amplify the electrical drive signals output from the DACs 12I and 12Q, respectively, to an amplitude level appropriate for the optical modulator 20. In this regard, the electrical amplifiers 13I and 13Q may be called drives. The electrical amplifiers 13I and 13Q may be arranged outside the electrical signal generator 10. The electrical drive signal output from the electrical amplifier 13I is input from an I-arm 21 of the optical modulator 20, and the electrical drive signal output from the electrical amplifier 13Q is input to a Q-arm 22 of the optical modulator 20.

A light source 15 produce a continuous light beam as a carrier wave. The optical modulator modulates the carrier wave with the electrical drive signals and outputs a modulated optical signal. A phase shifter 23 provides a phase difference of $\pi/2$ radians between the light beams travelling through the I-arm 21 and the Q-arm 22. The light beams with the $\pi/2$ phase difference are combined and the combined light signal is output from the optical modulator 20. A portion of the light signal output from the optical modulator 20 is branched by an optical coupler 31 and monitored by a photo detector (PB) 32, such as a photodiode. The signal monitored by the photo detector 32 (referred to as a "monitor signal") is supplied to a bias controller 140. When a photo detector 25 is provided in the optical modulator 20 to detect light leakage from the I and Q arm combined light, the monitor signal may be supplied to the bias controller 140 from the photo detector 25, in place of the photo detector 32.

The bias controller 140 controls a bias voltage that is applied to an electrode 231 of the phase shifter 23 and at least one of the I-arm 21 and the Q-arm 22, based upon the monitor signal. In FIG. 1, electrodes 211 and 212 provided to a pair of waveguides forming the I-arm 21 and electrodes 221 and 222 provided to a pair of waveguides forming the Q-arm 11 are depicted as straight bars for convenience sake. However, each of the electrodes 211, 212, 221, and 222 may be separated into two parts, one for receiving the electrical drive signal and the other for receiving the bias voltage.

When the modulation scheme is changed responsive to, for example, the propagation environment, a modulation scheme switching instruction is supplied from the external controller 100 to the optical transmitter 150. The external controller 100 is, for example, a control apparatus provided on a network. The modulation scheme switching instruction represents, for example, optical modulation signal format information, which information is input to the electrical signal generator 10. Let's assume a case where modulation is switched from 16-QAM to BPSK. During 16-QAM modulation, the electrical signal generator 10 generates electrical drive signals with four different amplitude levels for the I-arm 21 and the Q-arm 22 when performing 16-QAM. The optical modulator 20 provides 4-level phase shift keying to the light signals driven at the four amplitude levels, thereby outputting a 16-level optical multilevel signal.

Figure 1:
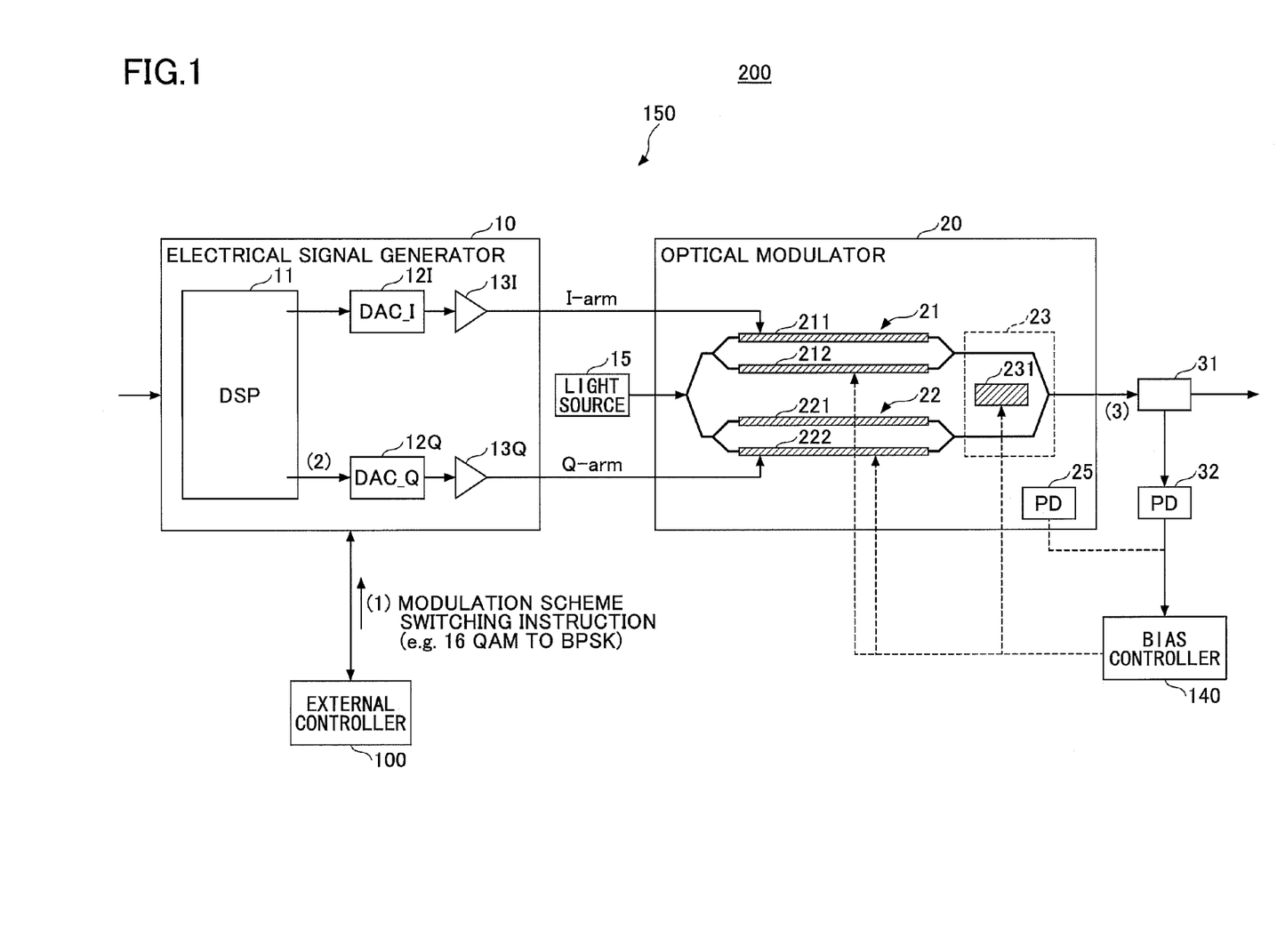
FIG. 1 is a diagram to explain a technical problem arising in a conventional optical transmitter using digital signal processing when changing the modulation scheme.

Upon reception of the modulation scheme switching instruct ion that represents change of the optical modulation format from 16-QAM to BPSK, for example (process (1) indicated by the arrow in FIG. 1), the electrical signal generator 10 turns off the output of the DAC 12Q (process (2)). Simultaneously, the signal format output from the DAC 12I is changed from a multilevel electrical signal with four or more different amplitude levels to a 2-level electrical signal. It is expected in the optical modulator 20 that the Q-arm moves into the extinction mode. However, the extinction ratio of a typical optical modulator is about 30 dB at best, and complete extinction cannot be achieved. For this reason, the light beams travelling through the I-arm 21 and the Q-arm 22 interfere with each other when output from the optical modulator 20, and the resultant BPSK signal is degraded (process (3)).

Figure 2A:
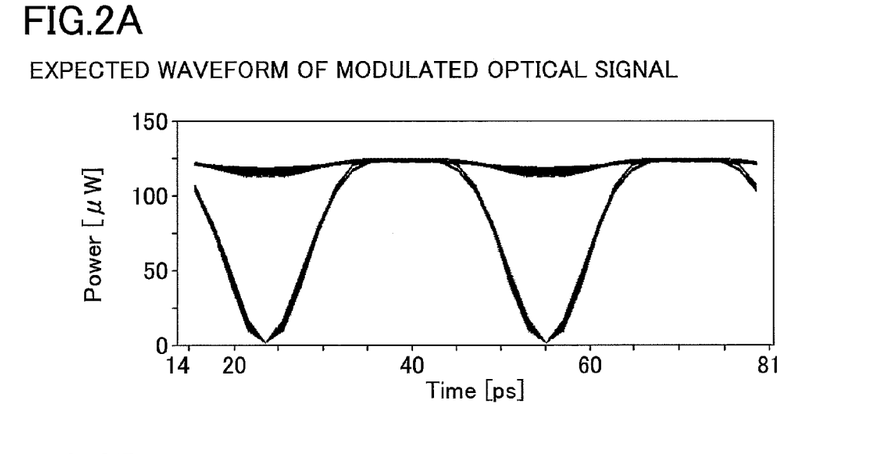
FIG. 2A illustrates an expected waveform generated upon changing the modulation scheme.
Figure 2B:
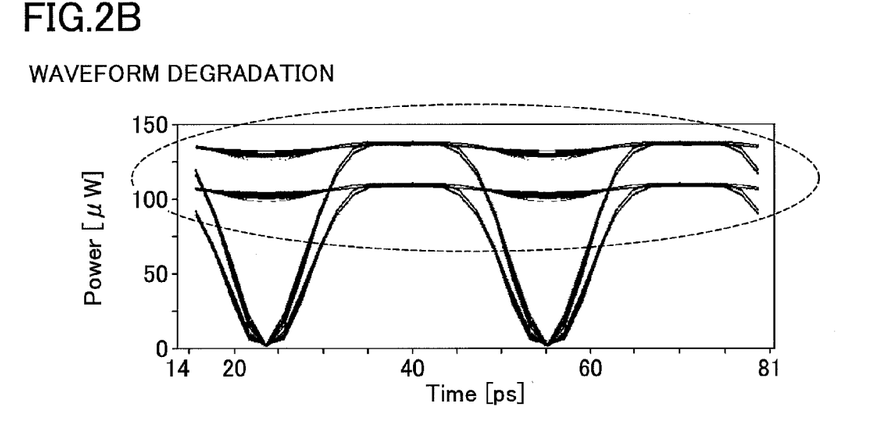
FIG. 2B is a diagram of a waveform of a modulated optical signal generated upon changing a modulation scheme.
Figure 2C:
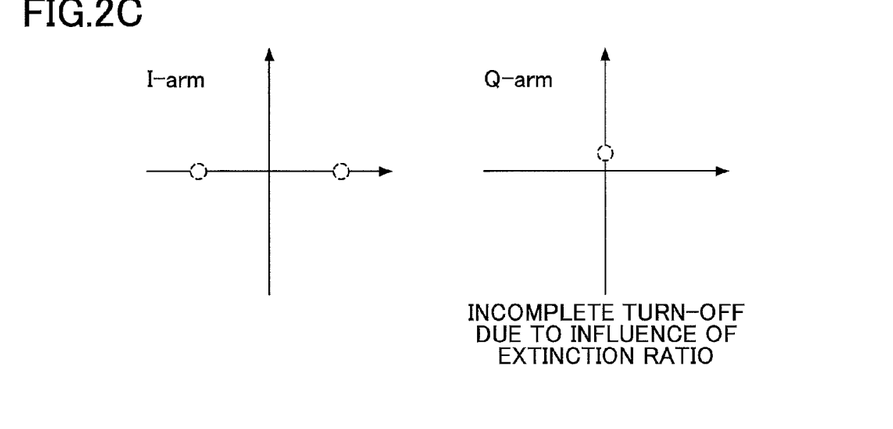
FIG. 2C is a diagram of constellations.

FIG. 2A through FIG. 2C illustrate degradation in the waveform of a BPSK optical signal. FIG. 2A illustrates the expected waveform of the BPSK signal, and FIG. 2B illustrates the waveform of the BPSK signal actually produced by the optical transmitter 150 of FIG. 1. As indicated in the area surrounded by the dashed line in FIG. 2B, the amplitude difference predetermined between bits varies and fluctuates due to the influence of signal interference, and the transmission signal quality is degraded. As illustrated in FIG. 2C, in the I-arm, the constellation points are located at 0 radians and $\pi$ radians on the in-plane axis of the I-Q plane. However, in the Q-arm, complete extinction cannot be achieved due to influence of the insufficient extinction ratio, and a constellation point remains on the quadrature axis (Q-channel).

Figure 3:
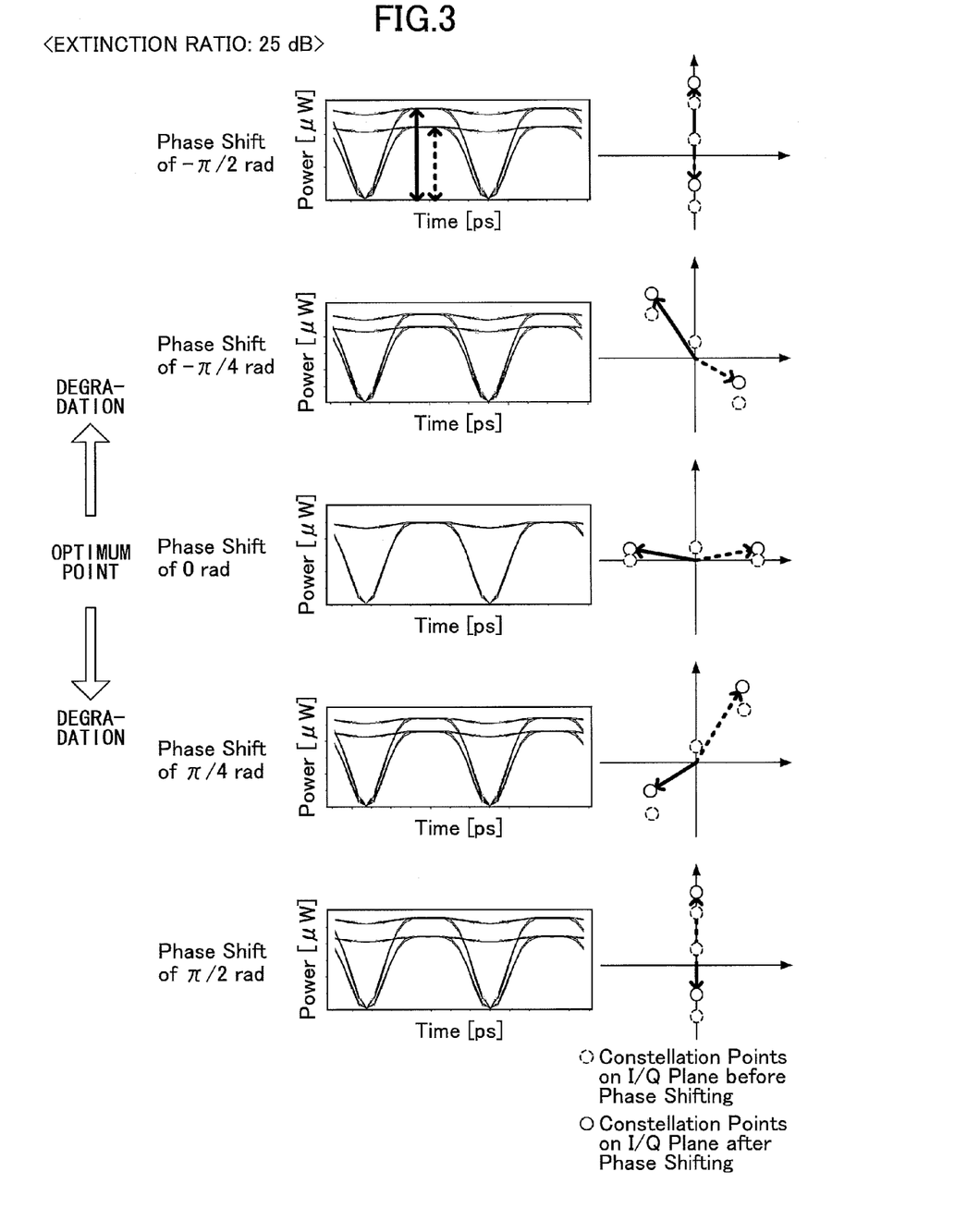
FIG. 3 is a diagram to explain the basic idea of the embodiment.
Figure 4:
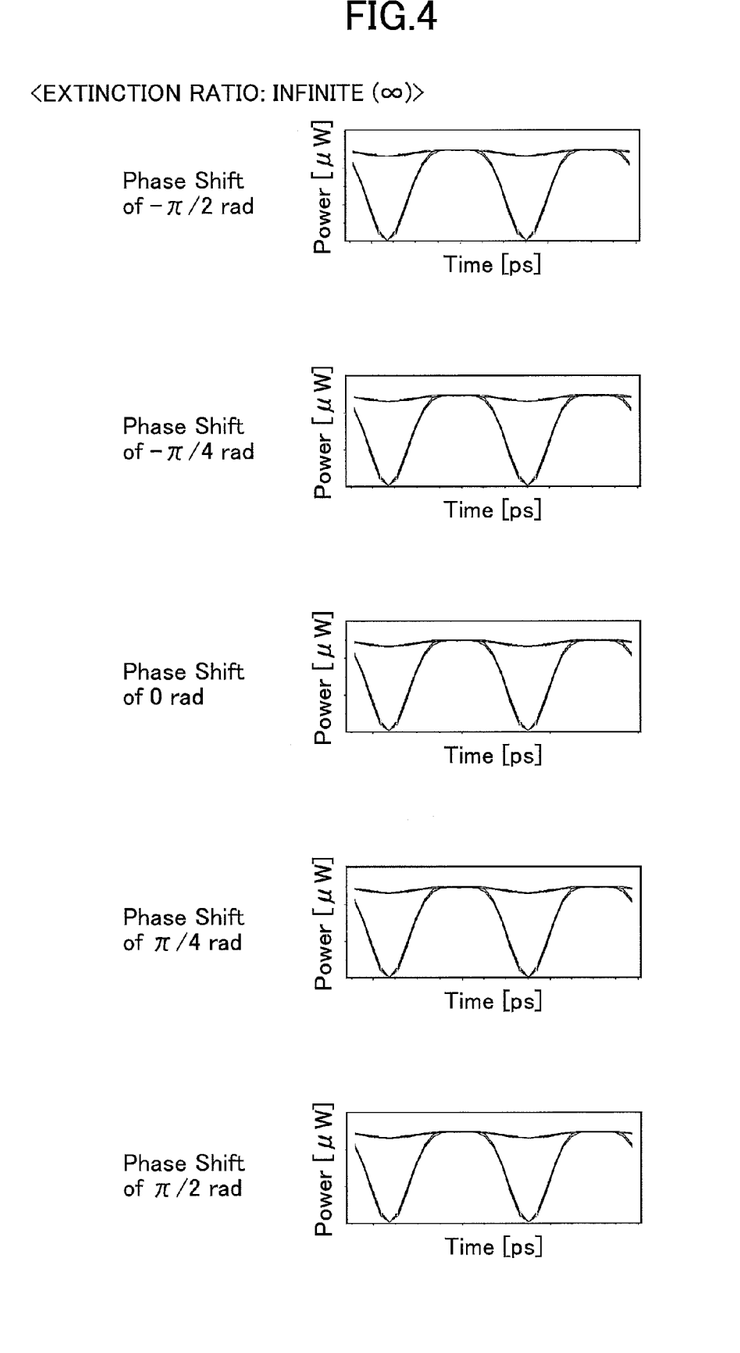
FIG. 4 is a diagram to explain the basic idea of the embodiment.

FIG. 3 and FIG. 4 are diagrams to explain the basic idea of the embodiments. The technique of the embodiment can prevent or reduce signal degradation due to influence of the extinction ratio by performing bias control on the phase shifter 23. FIG. 3 illustrates waveforms output from the optical modulator 20 with the extinction ratio of 25 dB. FIG. 4 illustrates waveforms output from the optical modulator 20 with the extinction ratio of an ideal value (in this example, infinity). When the optical modulator has an ideal extinction ratio (e.g., infinity), satisfactory waveforms can be acquired regardless of the quantity of phase shift (phase rotation) as illustrated in FIG. 4. In this case, it is unnecessary to perform particular control. In reality, the extinction ratio of a typically used optical modulator is 25 dB or 30 dB at most at present. The amplitude varies among bits depending on the quantity of phase shift and the waveform output from the optical modulator fluctuates as illustrated in FIG. 3.

In the right-hand side column of FIG. 3, the dashed circles on the I-Q plane represent the constellation points of the I-arm and the Q-arm before phase shifting, and the solid circles represent the constellation points after the phase shifting. The light beams passing through the I-arm are modulated by 2-level electrical signals, while the electrical signals for the Q-arm have been turned off. As indicated by the dashed circle located near the origin on the quadrature axis, complete extinction is not achieved in the Q-arm. The light component remaining in the Q-arm is combined with the light signal travelling through the I-arm, and it adversely affects the modulated optical signal. In other words, the light component remaining in the Q-arm has been reflected in the vectors indicated by the arrows pointing toward the constellation points of the I-arm after phase shifting. The lengths of the arrows extending to the constellation points correspond to the amplitudes of bits.

When the quantity of phase shift between the I-arm and the Q-arm is zero, the lengths of the vectors pointing toward the 0 radians and π radians are almost the same, and the amplitude variation among bits is prevented. When the quantity of phase rotation is π/4 radians, the lengths of the vectors are different from each other between the directions of π/4 radians and 5*π/4 radians. Similarly, with the phase rotation of −π/4 radians, the lengths of the vectors are different from each other between the directions of −π/4 radians and 3*π/4 radians. With the phase rotation of π/2 radians, the difference in lengths of the vectors further increases between the directions of π/4 radians and 3*π/2 radians and the fluctuation in the waveform increases.

From the above-noted simulation result, the inventor has conceived a technical idea of controlling the phase shifter 23 such that the phase shift between the I-arm and the Q-arm becomes 0+n*π radians (where n is an integer), thereby achieving stable outputs of optical signals.

Figure 5:
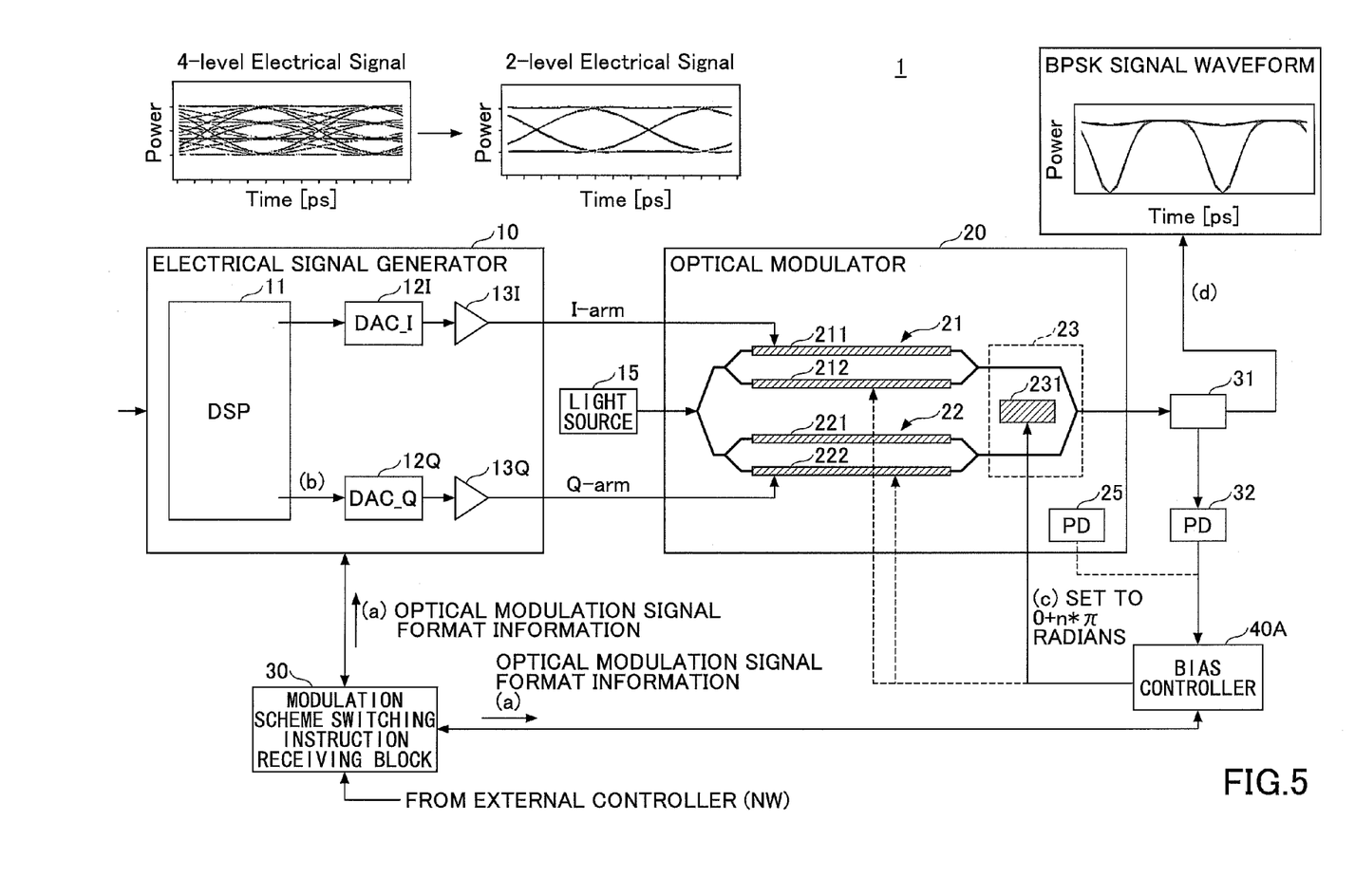
FIG. 5 illustrated a basic structure of an optical transmitter according to an embodiment.

FIG. 5 illustrates a basic structure of an optical transmitter 1 according to the embodiment. The elements the same as those illustrated in FIG. 1 are denoted by the same symbols and redundant explanation will be omitted. The optical transmitter 1 has an electrical signal generator 10, an optical modulator 20, a modulation scheme switching instruction receiving block 30, and a bias controller 40A. The electrical signal generator 10 has a digital signal processor (DSP) 11, digital-to-analog converters (DACs) 12I and 12Q, and electrical amplifiers 13I and 13Q. The electrical amplifiers 13I and 13Q may be arranged outside the electrical signal generator 10. The digital signal processor 11 generates electrical drive signals based upon input signals. The functions of the digital signal processor 11 may be realized by a memory and a processor, or alternatively, hardware circuits or a combination of hardware circuits and a processor may be used. The DACs 12I and 12Q convert the electrical drive signals into analog signals. The electrical amplifiers 13I and 13Q amplify the electrical drive signals output from the DACs 12I and 12Q, respectively, to an amplitude level appropriate for the optical modulator 20. The electrical drive signal output from the electrical amplifier 13I is input from an I-arm 21 of the optical modulator 20, and the electrical drive signal output from the electrical amplifier 13Q is input to a Q-arm 22 of the optical modulator 20. The I-arm 21 and the Q-arm may be formed by Mach-Zehnder (abbreviated by "MZ") interferometers, each MZ interferometer having a pair of waveguides to which electrical drive signals with opposite polarities are applied.

A light source 15 produces a continuous light beam as a carrier wave. The optical modulator modulates the carrier wave with the electrical drive signals and outputs a modulated optical signal. A phase shifter 23 provides a predetermined phase difference between the light beams travelling through the I-arm 21 and the Q-arm 22. The light beams with, for example, a π/2 phase difference are combined with each other and output from the optical modulator 20. The bias controller 40A controls a bias voltage applied to the optical modulator 20 based upon the output signal of the optical modulator 20.

As one of the features of the structure of FIG. 5, upon reception of a modulation scheme switching instruction from an external controller 100 (see FIG. 1), the modulation scheme switching instruction receiving block 30 of the optical transmitter 1 supplies optical modulation signal format information to the bias controller 40A as necessary, as well as to the electrical signal generator 10 (process (a)). For example, when changing the modulation scheme front 16-QAM to BPSK, the electrical signal generator 10 turns off the output of the DAC 12Q, while changing the output signal of the DAC 12I from a 4-level electrical signal to a 2-level electrical signal (process (b)). According to the optical modulation signal format information, the bias controller 40A regulates the bias voltage for the phase shifter 23 such that the quantity of phase shift provided by the phase shifter 23 becomes 0+n*π radians, where n is an integer (process (c)). Optionally, the bias voltage on the I-arm 21 may foe controlled. By controlling the quantity of phase shift at the phase shifter 23 to 0+n*π radians (where n is an integer), the fluctuation in signal waveform, can be suppressed and stable BPSK modulated optical signals can be output from the optical modulator 20.

Embodiment 1

Figure 6:
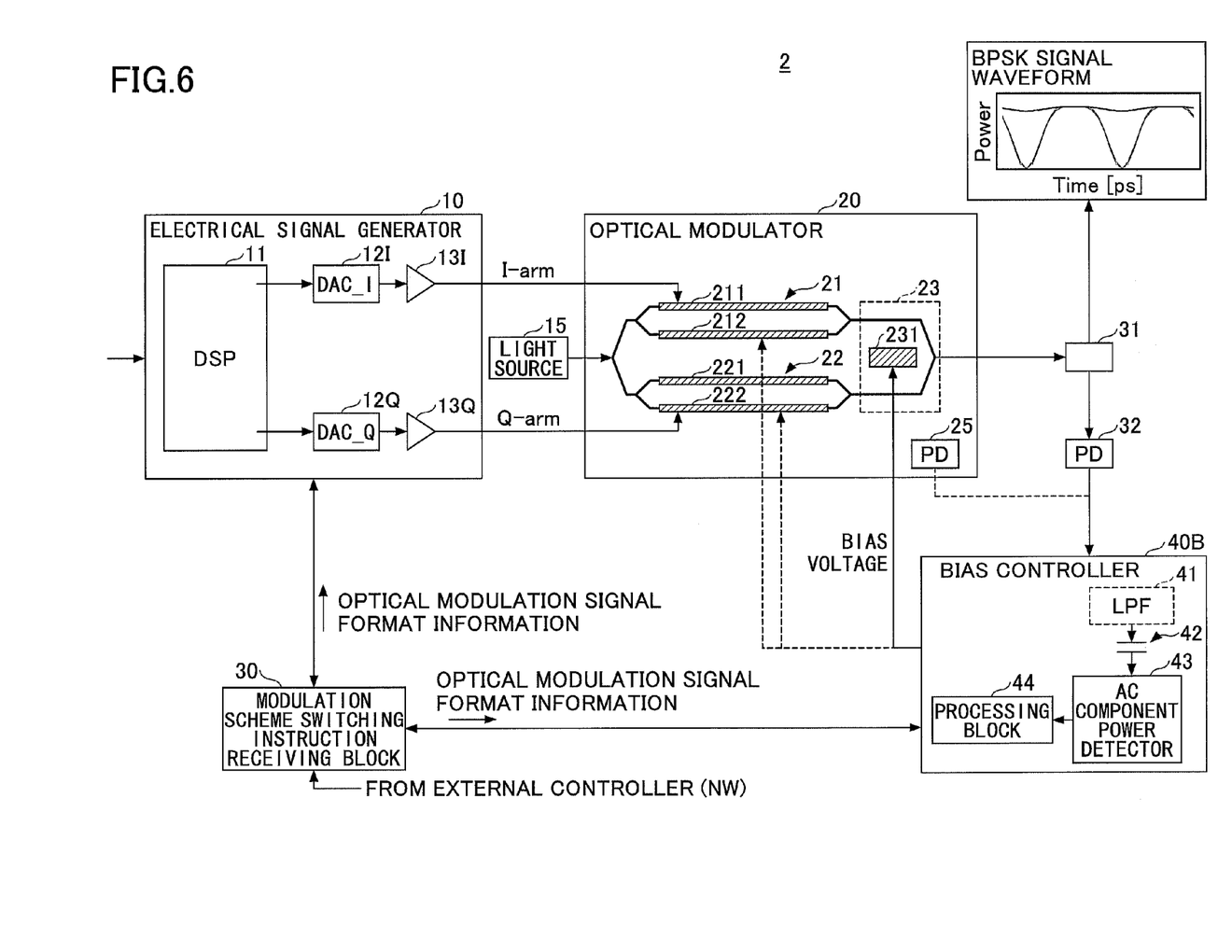
FIG. 6 is a schematic diagram of an optical transmitter of Embodiment 1.

FIG. 6 illustrates an optical transmitter 2 of Embodiment 1 with a structure to achieve the bias control of FIG. 5. The optical transmitter 2 has an electrical signal generator 10, an optical modulator 20, a modulation scheme switching instruction receiving block 30, and a bias controller 40B. The structures and the functions of the electrical signal generator 10, the optical modulator 20 and the modulation scheme switching instruction receiving block 30 are the same as those illustrated in FIG. 5. Upon reception of the modulation scheme switching instruction at the modulation scheme switching instruction receiving block 30 from the external controller 100, the optical transmitter 2 supplies optical modulation signal format information to the electrical signal generator 10 and the bias controller 40B. For example, when changing the modulation scheme from 16-QAM to BPSK, the electrical signal generator 10 turns off the output of the DAC 12Q, while changing the output of the DAC 12I from a 4-level electrical signal to a 2-level electrical signal. The bias controller 40B regulates the bias voltage applied to the phase shifter 23 of the optical modulator 20 such that the quantity of phase shift provided by the phase shifter 23 becomes 0+n*π radians, where n is an integer.

The bias controller 40B receives a monitor signal from the photo detector 32, the monitor signal representing a monitoring result of output light from the optical modulator 20. When a monitor PD 25 is provided in the optical modulator 20, detection information from the monitor PD 25 may be used in place of the monitor signal from the photo detector 32. In the bias controller 40B, an alternating current (AC) component extractor 42 extracts the AC component contained in the monitor signal and supplies the extracted AC component to an AC component power detector 43. The AC component extractor 42 is, for example, a capacitor adapted to remove a direct current component of the monitor signal. The AC component power detector 43 detects a power level of the extracted AC component and supplies the detection result to a processing block 44. The processing block 44 regulates the bias voltage for the phase shifter 23 based upon the power level of the detected AC component. Optionally, a low pass filter (LPF) 41 may be inserted before the AC component extractor 32 for the purpose of band limitation.

Figure 7:
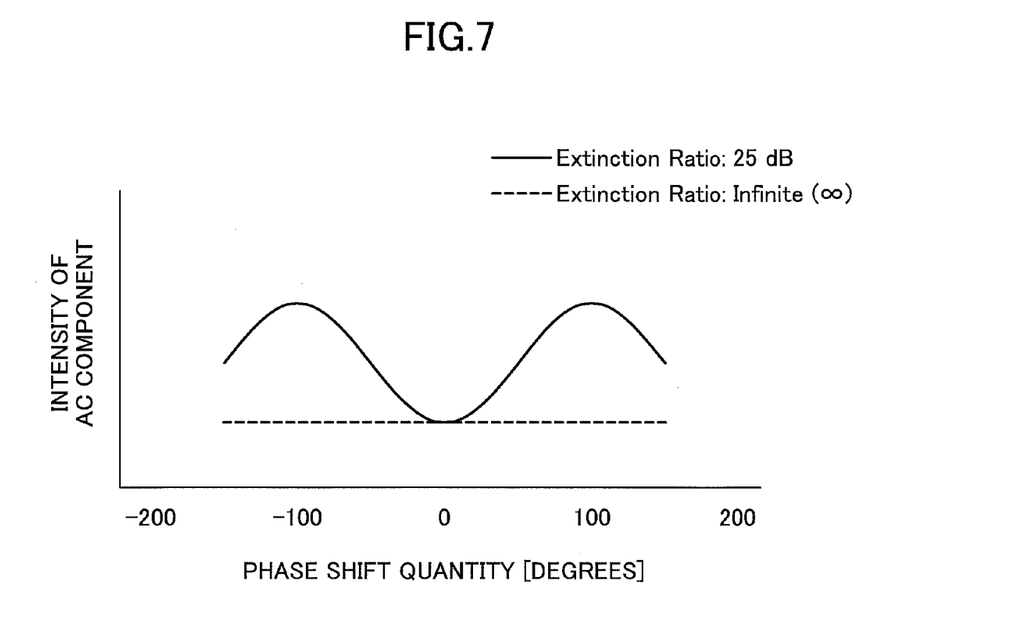
FIG. 7 illustrates extinction ratio dependency of monitor signal intensity as a function of quantity of phase shift.

FIG. 7 illustrates a relationship between phase shift quantity and intensity of AC component. The solid line represents the intensity of the AC component as a function of the phase shift quantity when the extinction ratio is 25 dB. The dashed line represents the intensity of the AC component with an infinite extinction ratio. When the extinction ratio is infinite, the AC component contained in the monitor signal is constant at a low level regardless of the quantity of phase shift. With the extinction ratio of 25 dB, the intensity of the AC component becomes the minimum at 0 degrees of phase shift and its power level becomes almost the same as that with the infinite extinction ratio. The intensity of the AC component becomes the maximum at ±90 degrees of phase shift. It is expected that the intensity of the AC component again becomes the minimum at ±180 degrees of phase shift. The AC component contained in the monitor signal indicates the fluctuation of the amplitude due to influence of insufficient extinction ratio (remaining light in the Q-arm) very well. This experimental result is consistent with the simulation result of FIG. 3.

Based upon the relationship illustrated in FIG. 7, the processing block 44 of the bias controller 40B controls the bias voltage applied to the phase shifter 23 such that the power level of the alternating current component contained in the monitor signal becomes the minimum when the modulation scheme has been changed from one making use of 4-level phase shift keying to another one making use of two phase values. Under this control, the quantity of phase shift provided by the phase shifter 23 is set to $0+n*\pi$ radians (where n is an integer) and stable BPSK optical signals with less amplitude fluctuation can be output.

During the period of 16-QAM modulation, bias control is performed by the bias controller 40B such that the quantity of phase shift provided by the phase shifter 23 is $\pi/2$ radians based upon the monitoring result of the alternating current component. In this period, the optical modulation signal format information may not be supplied to the bias controller 40B. The bias controller 40B controls the quantity of phase shift at the phase shifter 23 to $\pi/2$ radians by minimizing the detected alternating current component. Upon changing the modulation scheme to BPSK, the bias controller 40B can set the quantity of phase shift at the phase shifter 23 to $0+n*\pi$ radians (where n is an integer) by continuously minimizing the alternating current component.

The processing block 44 of the bias controller 40 may be realized by either hardware circuits or a memory and a processor. Alternatively, a combination of hardware circuits and a processor system including a memory and a processor may be employed.

Figure 8:
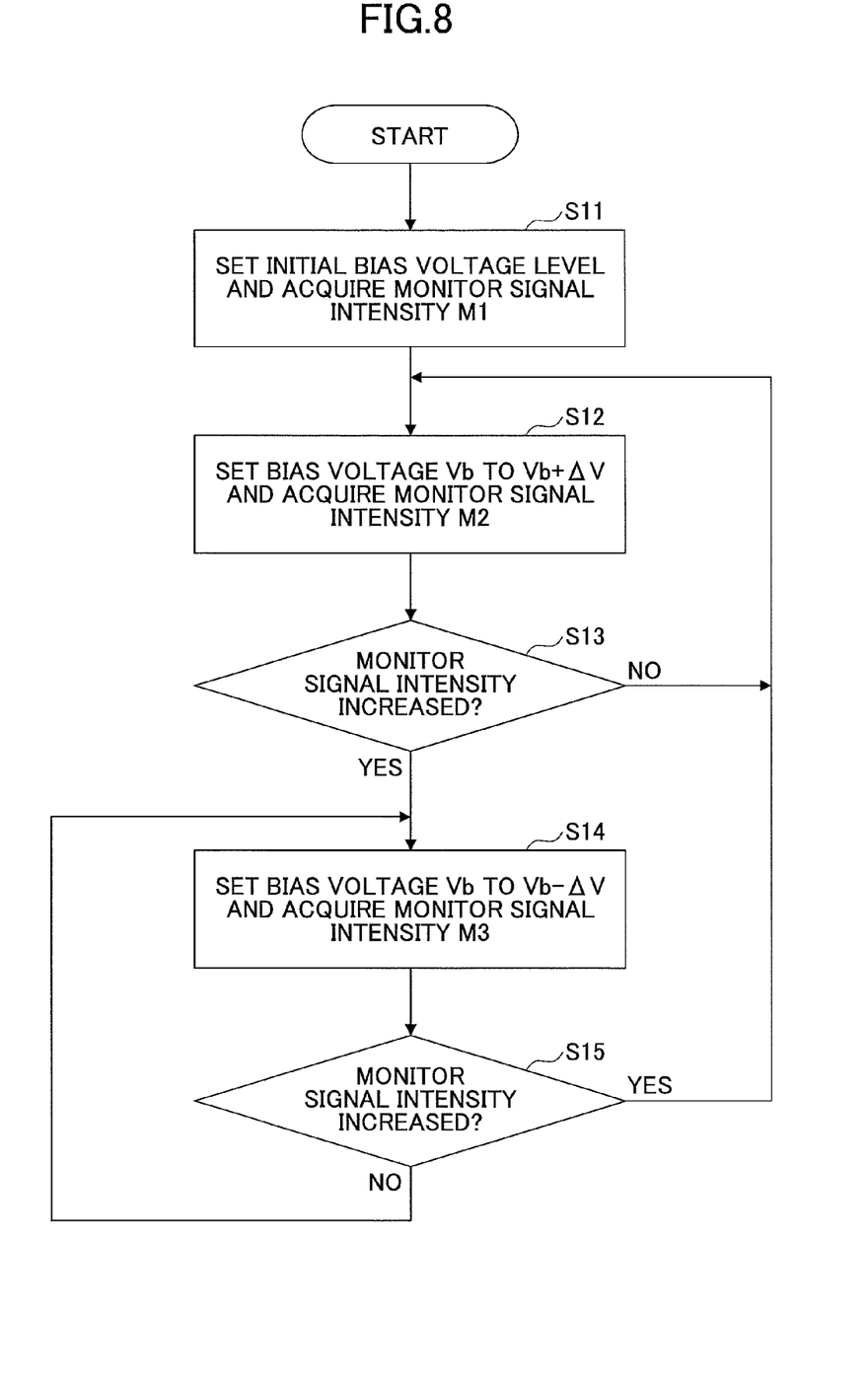
FIG. 8 is a flowchart of a control flow of Embodiment 1.

FIG. 8 is a flowchart of a control flow performed by the bias controller 40B. Since the control flow of FIG. 8 is continuously performed during the operation of the optical communication system to which the optical transmitter 2 is applied, a control flow ending block is omitted. Upon starting the control process, the bias voltage (Vb) applied to the electrode 231 of the phase shifter 23 is set to an initial voltage level, and the alternating current component contained in the monitor signal at the initial voltage level is detected to acquire and store the intensity (or the power level) M1 of the detected alternating current component (S11). The initial voltage level applied to the phase shifter 23 is, for example, 0 volts (Vb=0). In FIG. 8, the intensity of the alternating current component contained in the monitor signal is referred to as a "monitor signal intensity".

Next, the bias voltage Vb applied to the phase shifter 23 is set to Vb+ΔV to acquire and store the intensity (or the power level) M2 of the alternating current component contained in the monitor signal at that updated bias voltage level (S12). Then, the intensitys M1 and M2 of the alternating current component are compared to each other to determine whether the intensity of the alternating current component has increased by the application of the bias voltage (S13). If the intensity of the alternating current component has not increased (NO in S13), namely, if the intensity is unchanged or decreasing, it is determined that the control direction is appropriate. In this case, the process returns to step S12 to repeatedly update the bias voltage to Vb+ΔV. Under the application of the updated bias voltage, the intensity M3 of the alternating current component contained in the monitor signal is acquired and stored. On the other hand, if the intensity of the alternating current component has increased in determination of S13 (YES in S13), this means that, the control direction is the opposite direction. In this case, the bias voltage Vb is changed to Vb−ΔV to acquire and store the intensity M3 of the alternating current component contained in the monitor signal (S14). Then, it is determined again whether the intensity of the alternating current component has increased (S15). If the intensity has increased (YES in S15), the process returns to S12 and bias voltage Vb is set to Vb+ΔV because the currently performed control direction is opposite one. The intensity of the alternating current component is acquired and stored at the updated bias voltage. If in step S15 the intensity of the alternating current component is unchanged or decreasing (NO in S15), the bias voltage Vb is continuously set to Vb−ΔV to keep on performing bias control in the same direction, and the intensity of the alternating current component is acquired and stored at the updated bias voltage.

Under the above-noted control operations, the bias voltage applied to the phase shifter 23 is regulated so as to minimize the intensity of the alternating current component contained in the monitor signal. Consequently, the quantity of phase shift provided toy the phase shifter 23 is controlled to $0+n*\pi$ radians (where n is an integer) when the modulation scheme is switched to BPSK.

Embodiment 2

Figure 9:
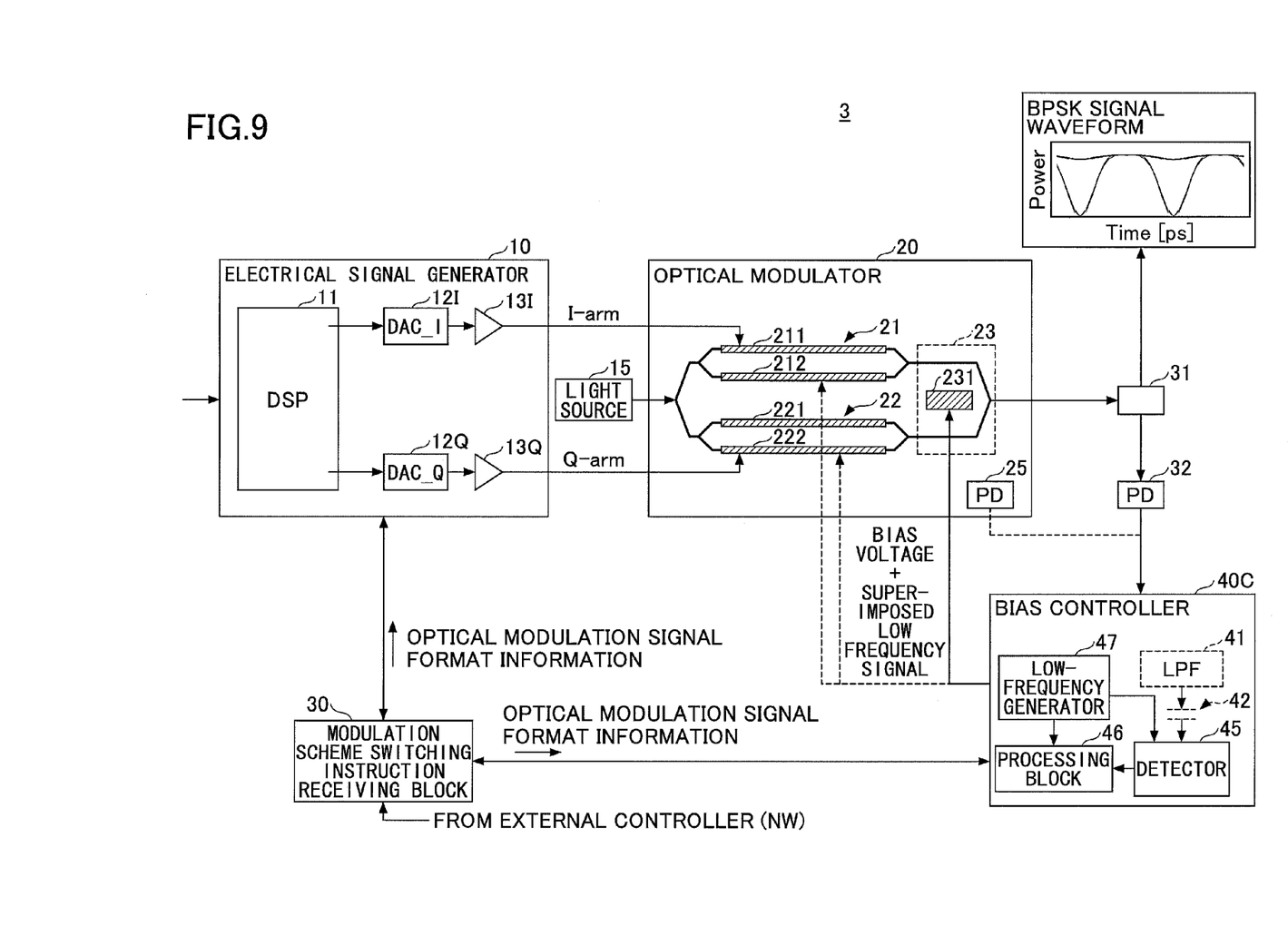
FIG. 9 is a schematic diagram of an optical transmitter of Embodiment 2.

FIG. 9 is a schematic diagram of an optical transmitter 3, which illustrates another structure of the bias control block of FIG. 5. The optical transmitter 3 has an electrical signal generator 10, an optical modulator 20, a modulation scheme switching instruction receiving block 30, and a bias controller 40C. The structures and the functions of the electrical signal generator 10, the optical modulator 20 and the modulation scheme switching instruction receiving block 30 are the same as those illustrated in FIG. 5 and FIG. 6. Upon reception of the modulation scheme switching instruction at the modulation scheme switching instruction receiving block 30 from the external controller 100, the optical transmitter 2 supplies optical modulation signal format information to the electrical signal generator 10 and the bias controller 40C. For example, when changing the modulation scheme from 16-QAM to BPSK, the electrical signal generator 10 turns off the output of the DAC 12Q, while changing the output of the DAC 12I from a 4-level electrical signal to a 2-level electrical signal. The bias controller 40C regulates the bias voltage applied to the phase shifter 23 such that the quantity of phase shift provided by the phase shifter 23 becomes $0+n*\pi$ radians, where n is an integer. In Embodiment 2, the bias controller 40C superimposes a low frequency signal on the bias voltage applied to the phase shifter 23, and it controls the bias voltage for the phase shifter 23 based upon a low frequency component contained in the monitor signal.

The bias controller 40C has a low frequency generator 47, a detector 45, and a processing block 46. The processing block 46 superimposes a low frequency signal generated by the low frequency generator 47 onto a direct current (DC) bias voltage to generate the bias voltage to be applied to the phase shifter 23. The low frequency signal has a sufficiently low rate compared to the data rate or the symbol rate, for example, its frequency is several kilohertz (kHz) used in automatic bias control for son-return-to-zero (NRZ) modulation format.

The detector 45 performs synchronous detection on the low frequency component contained in the monitor signal using the low frequency signal, and detects the intensity and the phase of the low frequency component. If the phase of the detected low frequency component is in-phase with the generated low frequency signal, the polarity of the synchronously detected signal is positive (with a plus sign). If the phase of the detected low frequency component is 180-degree out-of-phase, the polarity of the synchronously detected signal is negative (with a minus sign). Based upon the detection result obtained by the detector 45, the processing block 46 regulates the bias voltage applied to the phase shifter 23 so as to bring the intensity of the low frequency component to be closer to zero. The processing block 46 may be realized by either hardware circuits or a memory and a processor. Alternatively, a combination of hardware circuits and a processor system including a memory and a processor may be employed. Optionally, a low pass filter (LPF) 41 for band limitation and an AC component extractor 42 for removing a direct current component may be inserted before the detector 45.

Figure 10:
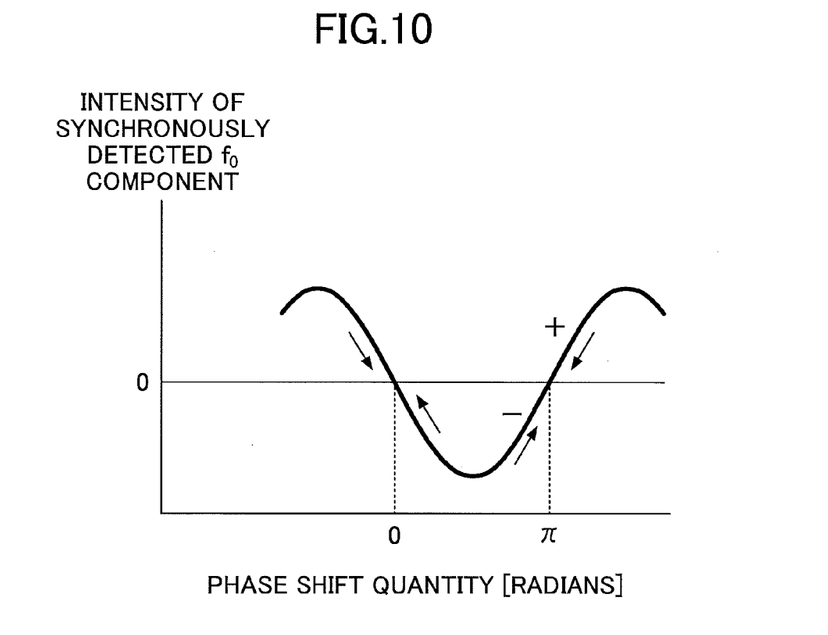
FIG. 10 illustrates a relationship between phase shift quantity and intensity of a low-frequency signal component.

FIG. 10 illustrates a relationship between phase shift quantity and intensity of synchronously detected low frequency ($f_0$) component. When the quantity of phase shift at the phase shifter 23 is $0+n*\pi$ radians in is an integer), the intensity of the detected low frequency component becomes zero. By controlling the bias voltage applied to the phase shifter 23 so as to bring the intensity of the detected low frequency component to be closer to zero, the bias controller 40C can control the quantity of phase shift at the phase shifter 23 to $0+n*\pi$ radians (n is an integer).

Figure 11:
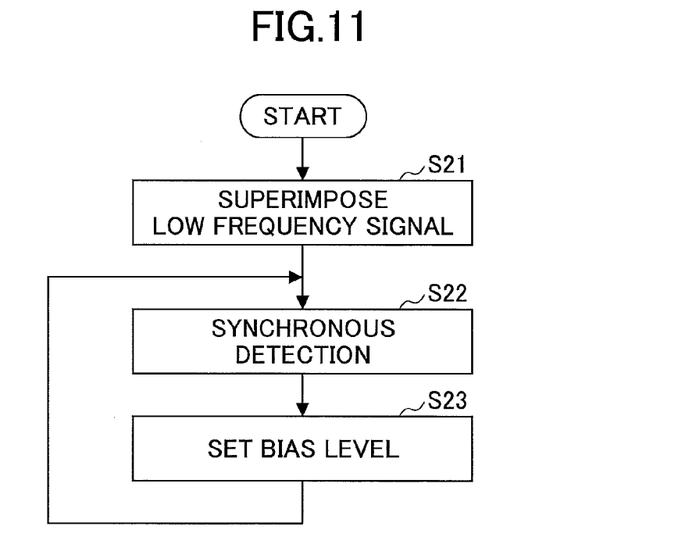
FIG. 11 is a flowchart of a control flow of Embodiment 2.

FIG. 11 is a flowchart of a control flow performed by the bias controller 40C. Since the control flow of FIG. 11 is continuously performed during the operation of the optical communication system to which the optical transmitter 3 is applied, a control flow ending block is omitted. First, a low frequency signal is superimposed on the bias voltage applied to the phase shifter 23 (S21). The output of the optical modulator is monitored, and synchronous detection is performed to detect a low frequency component contained in the monitor signal (S22). Based upon the synchronous detection result, the bias voltage level is regulated (S23). For example, if the synchronously detected low frequency component is in-phase with the low frequency signal superimposed on the bias voltage (with positive polarity), the processing block 46 determines that the currently setup bias voltage is lower than the optimum bias level and controls the bias voltage so as to increase the bias level (in the positive direction). If the synchronously detected low frequency component is 180-degree out-of-phase compared with the low frequency signal superimposed on the bias voltage (with negative polarity), the processing block 46 determines that the currently setup bias voltage is higher than the optimum bias level and controls the bias voltage so as to reduce the bias level (in the negative direction). The above-described bias control is applied to the region in which the slope of the intensity of the low frequency component is negative in FIG. 10 (where bias control is performed so as to bring the quantity of phase shift to be closer to 0 radians). Opposite control is performed in the region in which the slope of the intensity of the low frequency component is positive (where bias control is performed so as to bring the quantity of phase shift to be closer to $\pm\pi$ radians). Namely, if the synchronously detected low frequency component is in-phase with the low frequency signal superimposed on the bias voltage (with positive polarity), the processing block 46 determines that the currently setup bias voltage is higher than the optimum bias level and controls the bias voltage so as to reduce the bias level (in the negative direction). If the synchronously detected low frequency component is 180-degree out-of-phase compared with the low frequency signal superimposed on the bias voltage (with negative polarity), the processing block 46 determines that the currently setup bias voltage is lower than the optimum bias level and controls the bias voltage so as to increase the bias level (in the negative direction).

Other Applications

Figure 12:
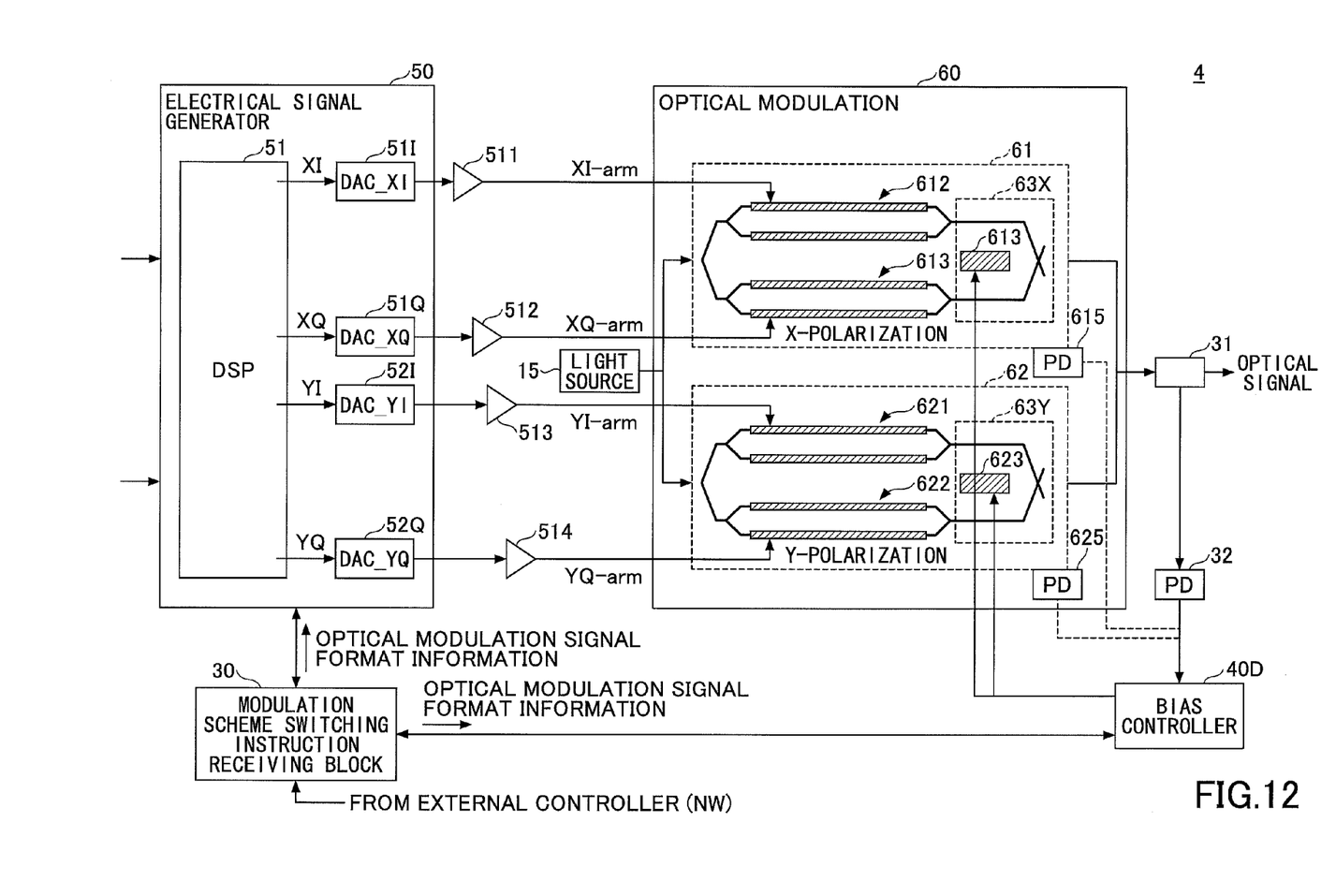
FIG. 12 is a schematic diagram of an optical transmitter of the embodiment applied to polarization division multiplexing.

FIG. 12 illustrates another example to which the technical concept of the embodiment is applied to polarization division multiplexing. An optical transmitter 4 has an electrical signal generator 50, an optical modulator 60, a bias controller 40D, and a modulation scheme switching instruction receiving block 30. The structure and the function of the modulation scheme switching instruction receiving block 30 are the same as those in Embodiment 1 and Embodiment 2. In the electrical signal generator 50, a digital signal processor 51 generates electrical drive signals XI, XQ, YI, and YQ based upon input signals. The DACs 51I, 51Q, 52I and 52Q convert the electrical drive signals into analog signals. The analog drive signals are amplified by amplifiers 511, 512, 513 and 514, respectively, to appropriate amplitude levels. The amplified analog drive signals are input, to the optical modulator 60.

The optical modulator 60 includes an X-polarization optical modulator 61 and a Y-polarization optical modulator 62. The electrical drive signals XI and XQ are respectively input to the I-arm 612 and the Q-arm 613 of the X-polarization optical modulator 61. The electrical drive signals YI and YQ are respectively input to the I-arm 621 and the Q-arm 622 of the X-polarization optical modulator 62. The X-polarization optical modulator 61 modulates a light beam emitted from the light source 15 with the electrical drive signals XI and XQ. The Y-polarization optical modulator 62 modulates a light beam emitted from the light source 15 with the electrical drive signals YI and YQ. The light components output from the X-polarization optical modulator 61 and the Y-polarization optical modulator 62 are combined at a multiplexer 31, and a polarization division multiplexed signal is output. A portion of the polarization division multiplexed signal is monitored by a photo detector (PD) 32. In the optical modulator 60, light leakage of the X-polarized light signal and Y-polarized light signal may be monitored by photo detectors (PDs) 615 and 625, respectively, and reflected in the monitor signal.

Upon reception of an instruction for changing the modulation scheme from, for example, dual polarization 16-QAM (DP-16QAM) to DP-BPSK from the external controller 100, the modulation scheme switching instruction receiving block 30 supplies optical modulation signal formation information to the electrical signal generator 50 and the bias controller 40D. The electrical signal generator 50 turns off the outputs of the DAC 51Q and DAC 52Q, while changing the signal format output from the DAC 51I and DAC 52I from a 4-level electrical signal to a 2-level electrical signal.

The bias controller 40D sets the phase shift quantity at the phase shifter 63X of the X-polarization optical modulator 61 and the phase shift quantity at the phase shifter 63Y of the y-polarization optical modulator 62 to 0+n*π radians (n is an integer). The bias control at the bias controller 40D may be performed based upon alternating current components as in Embodiment 1 or low frequency components as in Embodiment 2. Under the control of the bias controller 40D, amplitude fluctuation due to influence of insufficient extinction ratio can be reduced and dual polarization BPSK signals with less amplitude fluctuation can be output.

The above-stated control operations can be applied equally to switching from DF-16QAM to single-polarization (for example, X-polarization) BPSK. When changing the modulation scheme to X-polarization BPSK, the DACs 51Q, 52I and 52Q are turned off, and the quantity of phase shift at the phase shifter 63X is controlled to 0+n*π radians (n is an integer).

The embodiments have been explained above using specific examples of changing modulation scheme from 16-QAM to BPSK and from DP-16QBM to DP-BPSK or single-polarization BPSK. However, the invention is applicable to switching optical modulation from an arbitrary modulation scheme that makes use of four or more phase values to an arbitrary modulation scheme that makes use of two phase values. For example, the above-stated bias control can be carried out suitably when changing optical modulation from QPSK, SP-QPSK, differential QPSK (DQPSK), 64-QAM, etc., to differential BPSK.

With the structure and method of the embodiments, signal degradation arising when changing modulation scheme can be prevented in an optical transmitter capable of optical modulation using multilevel electrical signals produced by digital signal processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical transmitter comprising:
an electrical signal generator configured to generate an electrical drive signal based upon input data;
an optical modulator configured to modulate an input light by the electrical drive signal, the optical modulator having a first waveguide pair, a second waveguide pair, and a phase shifter that provides a phase difference between light waves travelling through the first waveguide pair and the second waveguide pair; and
a controller configured to set the phase difference at the phase shifter to 0+n*π radians, where n is an integer, when a modulation scheme of the optical modulator is changed from a first scheme using four or more phase values to a second scheme using two phase values.

2. The optical transmitter according to claim 1,
wherein the controller is configured to set the phase difference to 0+n*π radians by detecting an alternating current component contained in an output of the optical modulator and regulating a bias voltage applied to the phase shifter so as to minimize a power level of the alternating current component.

3. The optical transmitter according to claim 1,
wherein the controller is configured to set the phase difference to 0+n*π radians by superimposing a low frequency signal on a bias voltage applied to the phase shifter, detecting a low frequency component contained in an output of the optical modulator and regulating the bias voltage so as to bring an intensity of the low frequency component to be close to zero.

4. The optical transmitter according to claim 1,
wherein the electrical signal generator is configured to turn off the electrical drive signal supplied to one of the first waveguide pair and the second waveguide pair, and switch the electric drive signal supplied to another of the first waveguide pair and the second waveguide pair from a multilevel electrical signal with four or more amplitude levels to a two-level electrical signal with two amplitude levels.

5. The optical transmitter according to claim 1, further comprising:
a receiving block configured to receive a modulation scheme switching instruction externally,
wherein the controller is configured to set the phase difference to 0+n*π radians based upon the modulation scheme switching instruction.

6. The optical transmitter according to claim 1,
wherein the electrical signal generator has a digital signal processor that generates the electrical drive signal based upon the input data, and
wherein the digital signal processor is configured to control generation of the electrical drive signal based upon a modulation scheme switching instruction supplied externally.

7. The optical transmitter according to claim 1,
wherein the optical modulator includes a first optical modulator configured to perform optical phase modulation on a first polarized wave and a second optical modulator configured to perform optical phase modulation on a second polarized wave whose polarization axis is perpendicular to that of the first polarized wave, and
wherein the controller is configured to set a first phase difference at a first phase shifter provided to the first optical modulator and a second phase difference at a second phase shifter provided to the second optical modulator to 0+n*π radians when the modulation scheme is changed from the first scheme to the second scheme.

8. An optical transmission system comprising:
an optical transmitter according to claim 1; and
an external controller configured to supply a control signal for changing the modulation scheme.

9. An optical communication control method comprising:
generating an electrical drive signal based upon input data;
supplying the electrical drive signal to an optical modulator that has a first waveguide pair, a second waveguide pair and a phase shifter that provides a phase difference between light waves travelling through the first waveguide pair and the second waveguide pair to modulate an input light; and
setting the phase difference provided by the phase shifter to 0+n*π radians, where n is an integer, when the modulation scheme of the optical modulator is changed from a first scheme using four or more phase values to a second scheme using two phase values.

10. The optical communication control method according to claim 9, further comprising:

detecting an alternating current component contained in an output of the optical modulator; and setting the phase difference to 0+n*π radians by regulating a bias voltage applied to the phase shifter so as to minimize a power level of the alternating current component.

11. The optical communication control method according to claim 9, further comprising:

superimposing a low frequency signal on a bias voltage applied to the phase shifter;

detecting a low frequency component contained in an output of the optical modulator; and setting the phase difference to 0+n*π radians by regulating the bias voltage so as to bring an intensity of the low frequency component to be close to zero.

* * * * *